United States Patent
Hegner et al.

(10) Patent No.: US 7,181,974 B2
(45) Date of Patent: Feb. 27, 2007

(54) MOISTURE-PROTECTED PRESSURE SENSOR

(75) Inventors: Frank Hegner, Lörrach (DE); Andreas Rossberg, Bad Säckingen (DE); Thomas Uehlin, Schopfheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/560,339

(22) PCT Filed: Jun. 9, 2004

(86) PCT No.: PCT/EP2004/006215

§ 371 (c)(1),
(2), (4) Date: Jun. 21, 2006

(87) PCT Pub. No.: WO2004/111594

PCT Pub. Date: Dec. 23, 2004

(65) Prior Publication Data

US 2006/0254363 A1 Nov. 16, 2006

(30) Foreign Application Priority Data

Jun. 12, 2003 (DE) ................................ 103 26 975

(51) Int. Cl.
*G01L 9/12* (2006.01)
(52) U.S. Cl. ...................................................... 73/724
(58) Field of Classification Search .................. 73/714, 73/718, 724, 706, 722, 862.61; 324/662; 361/283

See application file for complete search history.

(56) References Cited

U.S. PATENT DOCUMENTS

| | | | | |
|---|---|---|---|---|
| 3,808,480 A * | 4/1974 | Johnston | | 361/283.4 |
| 4,490,773 A * | 12/1984 | Moffatt | | 361/283.4 |
| 5,181,423 A * | 1/1993 | Philipps et al. | | 73/724 |
| 5,438,275 A * | 8/1995 | Fado et al. | | 324/662 |
| 5,817,943 A * | 10/1998 | Welles et al. | | 73/718 |
| 6,418,793 B1 * | 7/2002 | Pechoux et al. | | 73/714 |

FOREIGN PATENT DOCUMENTS

| | | |
|---|---|---|
| DE | 4227893 | 4/1993 |
| DE | 10043630 | 3/2002 |
| DE | 10135568 | 2/2003 |
| DE | 10221219 | 12/2003 |

(Continued)

*Primary Examiner*—Jewel Thompson
(74) *Attorney, Agent, or Firm*—Bacon & Thomas, PLLC

(57) ABSTRACT

A pressure sensor includes: a measuring cell having a base plate and a measuring membrane connected along its edge with the base plate, and means for generating an electrical quantity dependent on deformation of the measuring membrane; a circuit for registering the electrical quantity; and a capsule having a capsule body and a sealing element, with which the capsule is hermetically sealed along a joint. The capsule encloses the circuit, in order to protect such from influences of moisture; and the joint of the capsule is mechanically decoupled from the base plate. The mechanical decoupling of the joint means, for example, that at least the axial support of the pressure measuring cell in a housing is not allowed to be transferred through the joint. Despite arranging of the capsule on the base plate, pressure-related and temperature-related distortions of the base plate are not permitted to have any effects on the joint of the capsule.

9 Claims, 1 Drawing Sheet

FOREIGN PATENT DOCUMENTS

| | | |
|---|---|---|
| EP | 0974825 | 1/2000 |
| EP | 1061351 | 12/2000 |
| EP | 1070946 | 1/2001 |
| EP | 1106982 | 6/2001 |
| WO | WO 03054499 | 7/2003 |
| WO | WO 03058186 | 7/2003 |

* cited by examiner

MOISTURE-PROTECTED PRESSURE SENSOR

FIELD OF THE INVENTION

BACKGROUND OF THE INVENTION

"Pressure sensors" in the sense used herein includes absolute pressure sensors and relative pressure sensors, the first of which, measures, for a medium being measured, absolute pressure compared with vacuum, and the second, the difference between pressure in a medium being measured and the current atmospheric pressure. A pressure sensor includes, in general, a pressure measuring cell comprised of a base plate and a measuring membrane, or diaphragm, with a pressure chamber being formed between the measuring membrane and the base plate. The pressure-dependent deformation of the measuring membrane is a measure for the pressure, and such is converted in suitable manner into an electrical quantity, or primary signal. For conditioning the primary signal, or electrical quantity, usually there is an electronic circuit, for example a hybrid circuit, arranged preferably in the immediate vicinity of the primary signal source, for example on the rear face of the base plate, the face not containing the pressure chamber. The electronic circuit, it is true, is arranged in a sensor housing, for protecting it from dirt, etc., but is still exposed to the air of the environment. In such case, especially under realistic operating conditions fluctuating air humidity proves to be a difficultly manageable source of malfunctions, since it can lead to, among others, changes in the properties of the components of the electric circuit and even of the connecting lines and, consequently, to corruptions of the measurement signals. These corruptions are, it is true, small and acceptable for standard applications, but, in the case of precision sensors, something must be done about them. Thus, there are efforts to minimize the influences of moisture by encapsulation of the electric circuit. Unpublished International Patent Application No. PCT/EP02/14787 of the present assignee discloses, to this end, a ceramic, capacitive, relative pressure sensor having a ceramic pot connected to the rear face of the pressure sensor, in order to form a chamber in which the hybrid circuit enclosed in the chamber is protected from the influences of moisture. This concept is, however, capable of improvement for the following reasons.

Even though the pot is held in place by adhesive, moisture can still get inside the pot, because organic materials do not offer satisfactory long-term protection, this being indicated, for example, in a report entitled "Hermeticity of Polymeric Lid Sealants" by R. K. Traeger, New Initiatives, Sandia Laboratories, Albuquerque, N.Mex., USA. Additionally, the pot in the case of the pressure sensor of the above application extends over the entire rear face of the base plate. Therefore, the rear, axial support of the pressure measuring cell against the process pressure must occur through the pot and especially through the joint between pot and base plate. Sufficiently strong, interfacial, brazed, or hard-solder, joints cannot be implemented in the presence of the enclosed hybrid circuit, because the temperatures required for such would be too high for the hybrid circuit. The use of soft solder for joining the pot with the base plate can lead to hysteresis phenomena, since the joint is susceptible to plastic deformation due to pressure shocks and temperature fluctuations.

SUMMARY OF INVENTION

It is, therefore, an object of the present invention to provide a pressure sensor having a lasting moisture protection for the electric circuit, or the electric signal path, as the case may be.

The pressure sensor of the invention for the measuring of a pressure of a medium includes a measuring cell having a base plate, a measuring membrane loadable with a pressure to be measured and connected at its edge with the base plate, and means for converting the pressure-dependent deformation of the measuring membrane into an electrical quantity; an electric circuit for the registering of the electrical quantity; and a capsule with sealing element, with which the capsule is hermetically, tightly sealed along a joint, with the circuit being enclosed within the sealed capsule, in order to protect the circuit from moisture, with the joint being mechanically de-coupled from the base plate.

The base plate of the pressure measuring cell can be, among other things, a crystalline or ceramic base plate, with a ceramic base plate, especially one of corundum, being currently preferred.

The registered electrical quantity can be, for example, a capacitance between electrodes, respectively, on the measuring membrane and on the base plate, or it can be, for example, a deformation-dependent resistance.

The mechanical decoupling of the joint means, for example, that at least the axial support of the pressure sensor is not permitted to be transferred through the joint. To the extent that the capsule is arranged on the base plate, pressure-related and temperature-related deformations of the base plate should have no effect on the joint of the capsule. This means, among other things, that the base plate cannot serve as the sealing element of the capsule.

The capsule can, for instance, involve a ceramic body and a ceramic sealing element. In this case, the required electrical feed-throughs can be implemented, for example, by contact pins, which are soldered into bores through the capsule body. The joint, in this case, can include a solder or braze material. The coefficients of thermal expansion of the capsule body and the sealing element should deviate as little as possible from one another and, preferably, should be identical. This can be achieved, especially, by the use of the same material. In a currently preferred form of embodiment, the capsule body and the sealing element comprise corundum. This is especially expedient, when the circuit, especially a circuit in the form of a hybrid circuit, is arranged on a corundum support.

Furthermore, the capsule can comprise a metal capsule body and a metal sealing element. In this case, the required electrical feed-throughs can be realized, for example, by contact pins, which are sealed by glass in bores through the capsule body. The joint can, in this case, comprise a solder, braze or weld. In the case of a currently preferred form of embodiment, the capsule body and the sealing element comprise Kovar. This choice of material is likewise suited in the case of use of hybrid circuits on a corundum carrier, since Kovar and corundum have about the same coefficients of thermal expansion.

Additionally, hermetically sealed capsules with a capsule body and sealing element of glass are suitable for use.

The capsule can be held, for example, by connection lines, via which the circuit registers the electrical quantity, and which extend between the rear face of the base plate and the capsule. In a further embodiment of the invention, the capsule can additionally sit on the rear face of the base plate via one or more projections. Additionally, the at least one projection can be secured to the rear face.

The encapsulation effects, for example, a considerable improvement of the zero-point stability of an absolute pressure sensor. Thus, an increasing of the relative air humidity from 30% to 95% at 30° C. causes a zero point shift of about 0.001% to 0.02% of the span of the sensor. The largest group of tested sensors had a zero-point shift of about 0.002%. Without encapsulation, the zero-point shift is, in comparison, about 0.1% to 0.2% of the span.

For further improving the protection against moisture, selected, exposed surfaces of the pressure sensor, or base plate and capsule, can be made hydrophobic. To this belong, especially, the connection lines and their environment between the base plate and capsule. Suitable for rendering these areas hydrophobic is an impregnation, for example, with silanes from a solution, or deposition of hydrophobic substances from a gas-phase. With regard to details concerning hydrophobic materials and methods, reference is made to older applications of the assignee, for instance European Patent Application EP 1 061 351 A1, and the International Patent Application PCT/EP02/14443.

Hydrophobic properties of the surfaces and the connection lines become increasingly important, the closer the connection lines are to one another. Additionally, the importance of the hydrophobic properties increase, when the wires are separated from one another not by air, but, instead, by a polymer, for example in a flexible cable, which means, on the one hand, a greater dielectric constant, and, on the other hand, further surfaces on which condensation can occur.

The added hydrophobic treatment reduces, for example, the zero-point error of a sensor with encapsulated electronics from 0.02% to 0.007% when relative humidity is increased from 30% to 95% at 30° C.

For supplemental reduction of the effects of residual moisture on stray capacitances of the connection lines—and, consequently, on the registered electrical quantity—the connection lines can be surrounded by a suitable shielding. It has been found, however, on the basis of control measurements, that this shielding brings-about only a slight additional improvement.

BRIEF DESCRIPTION OF THE DRAWING

Further aspects of the invention will be apparent on the basis of the dependent claims, the following description of an example of an embodiment, and the drawing, the figure of which shows as follows:

DESCRIPTION OF THE PREFERRED EMBODIMENT

Figure 1:
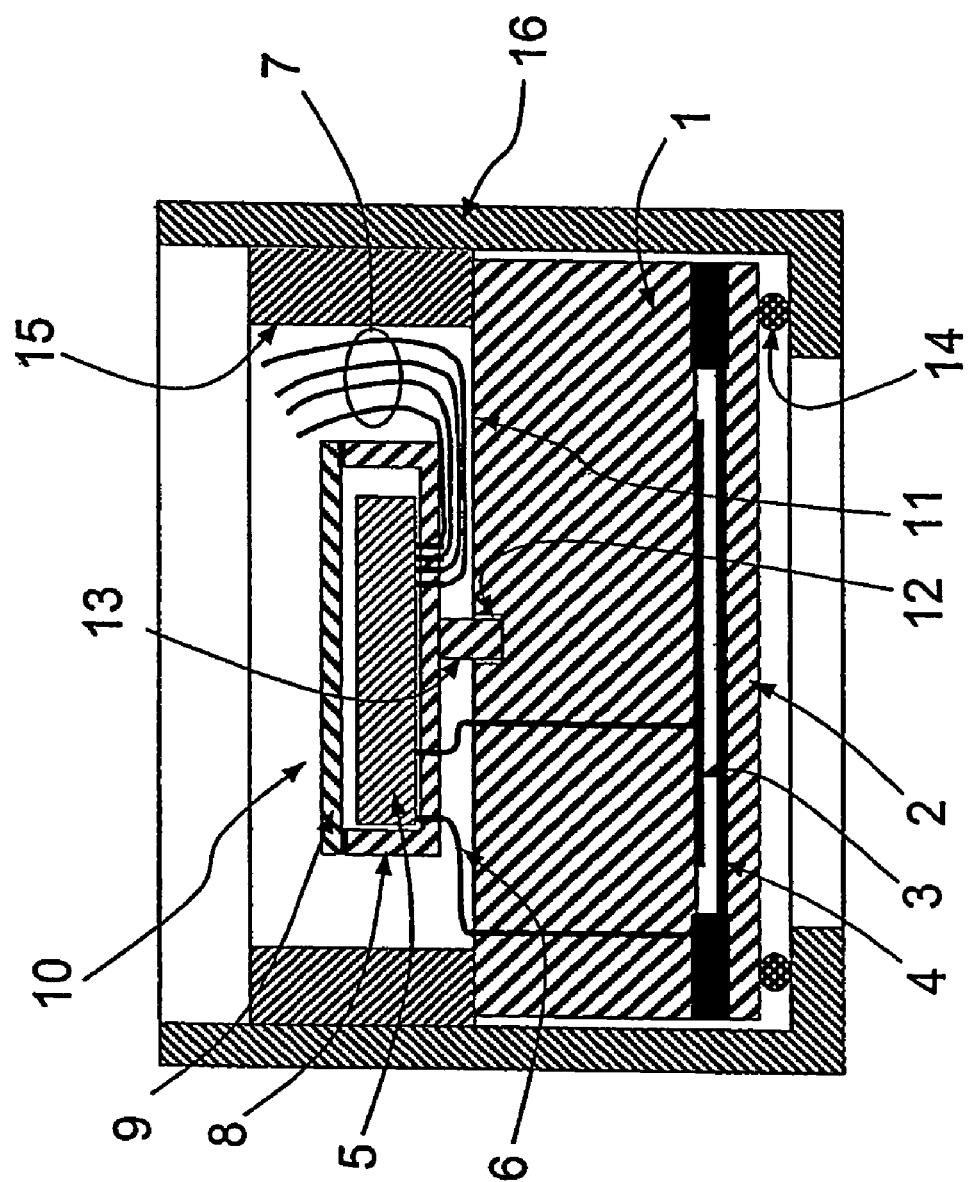
FIG. 1 a longitudinal section through a pressure sensor of the invention.

The pressure sensor illustrated in FIG. 1 comprises a measuring cell, having a base plate 1 and a measuring membrane 2, which is secured to the base plate, accompanied by formation of a pressure chamber. During measuring operation, the measuring membrane 2 is loaded, on its surface facing away from the base plate 1, with a pressure being measured. In the case of relative pressure sensors, the pressure chamber is in communication with atmospheric pressure through a pressure chamber opening, while, in the case of absolute pressure chambers, the chamber is pressure-tightly sealed and evacuated. Deformation of the measuring membrane can be registered on the basis of usual measuring principles, for example according to the capacitive, resistive or resonance methods. In the case of the illustrated embodiment, the capacitance between a first electrode 3 on the front face of the base plate 1 and a second electrode 4 on the pressure-chamber-facing surface of the measuring membrane 2 is determined. The electrodes are connected via electrical feed-throughs and conductors 6 connected therewith, to a hybrid circuit 5.

The hybrid circuit 5 is arranged in a capsule 10, which is arranged on the rear face 11 of the base plate facing away from the measuring membrane 2. Capsule 10 includes a metal capsule-body 8 and a lid 9, which preferably is of the same material as the capsule body 8. Insofar as the hybrid circuit 5 includes, in a currently preferred embodiment, a corundum support, Kovar is especially suited as material for the capsule-body 8 and for the lid 9. Lid 9 is connected with the capsule body by a circumferential weld seam, whereby the hybrid circuit is hermetically sealed in the capsule. The requisite electrical feed-throughs for the contacting of the hybrid circuit include contact pins, which are glass-sealed in bores extending through the capsule body 8. As already mentioned, the capacitor electrodes 3, 4 are connected to the hybrid circuit. This contacting occurs via conductors 6, which are welded or soldered to the contact pins of the electrical feed-throughs. The hybrid circuit additionally utilizes an interface 7, via which it is supplied with energy from a superordinated unit and transfers signals to such unit and/or receives signals from this unit. The signal communication can be both analog and digital. The superordinated unit can be, for example, a transmitter module, to which the sensor is connected. The transmitter module comprises further circuits, for example, for conditioning the signals received via the interface 7 and for communication of a signal representing the measured value of the sensor. Communication can occur according to one of the known protocols, for example 4 . . . 20 mA, HART, Foundation Fieldbus or Profibus.

The capsule has, in one form of embodiment, a post 13 arranged on the underside of the capsule body, facing toward base plate 1. Post 13 engages with a complementary seat 12 on the rear face 11 of base plate 1, so that the position of capsule 10 is defined with reference to the base plate. The post additionally defines a separation between the underside of the capsule 10 and the rear face 11 of the base plate 1. In this way, capsule 10 is largely decoupled mechanically and thermally from the base plate.

The mechanical decoupling has, among other things, the effect that clamping forces, with which the pressure measuring cell is secured in a sensor housing, do not influence the joint between the capsule body 8 and the lid 9 of the capsule 10. In the case of the described example of an embodiment, the sensor is axially clamped in an essentially cylindrical housing 16 between a threaded ring 15 and, as required, a support ring (not shown), on the one side, and an O-ring 14, on the other side. As a result of the clamping forces, bending moments can be introduced into base plate 1. These bending moments can cause the rear face 11 of the base plate to deform. Due to the mechanical decoupling of the capsule 10 from the base plate 1, this deformation has no effect on the joint and thus no effect on the long term sealing of capsule 10. Additionally, expansion differences between the capsule, or components of the capsule, and the base plate do not at all affect the base plate, so that the measured value of pressure is also not affected.

The invention claimed is:

1. A pressure sensor, comprising:

a measuring cell having a base plate, a measuring membrane loadable with a pressure to be measured and connected along its edge with said base plate, and at least one means for converting pressure-dependent deformation of said measuring membrane into an electrical quantity;

an electrical circuit for registering said electrical quantity; and a capsule having a capsule body and a sealing element, with which said capsule is hermetically sealed along a joint, wherein:

said capsule encloses said electrical circuit for protecting such from moisture, and the joint of said capsule is mechanically decoupled from said base plate.

2. The pressure sensor as claimed in claim 1, wherein:

said base plate of said measuring cell comprises a crystalline or ceramic material, especially corundum.

3. The pressure sensor as claimed in claim 1, wherein:

said at least one means comprise electrodes; and said electrical quantity is a capacitance between said electrodes, respectively, on said measuring membrane and on said base plate, or a deformation-dependent resistance.

4. The pressure sensor as claimed in claim 1, further comprising:

a housing, in which said measuring cell is axially clamped, wherein:

the axial clamping forces of said measuring cell are not transferred through the joint of said capsule.

5. The pressure sensor as claimed in claim 1, wherein:

said capsule comprises a ceramic or metal material, especially Kovar.

6. The pressure sensor as claimed in claim 1, wherein:

said capsule is held by electrical connection lines, which extend between said capsule and said measuring cell.

7. The pressure sensor as claimed in claim 1, wherein:

said capsule and/or the rear face of said base plate have/has at least one projection, by way of which a defined separation is maintained between the rear face of said base plate and said capsule.

8. The pressure sensor as claimed in claim 7, wherein:

said at least one projection is engaged in a complementary cavity on said base plate and/or on said capsule.

9. The pressure sensor as claimed in claim 1, wherein:

sections of surfaces of said measuring cell and said capsule are treated to be hydrophobic.

* * * * *